(12) United States Patent
Kanao

(10) Patent No.: US 8,646,489 B2
(45) Date of Patent: Feb. 11, 2014

(54) CONNECTION STRUCTURE OF WAVE-SHAPED SYNTHETIC RESIN PIPES, WAVE-SHAPED SYNTHETIC RESIN PIPES USED FOR THE CONNECTION STRUCTURE, AND MANUFACTURING METHOD THEREOF

(75) Inventor: Shigeki Kanao, Nishinomiya (JP)

(73) Assignee: Kanaflex Corporation Inc., Osaka-shi, Osaka (JP)

(*) Notice: Subject to any disclaimer, the term of this patent is extended or adjusted under 35 U.S.C. 154(b) by 863 days.

(21) Appl. No.: 12/399,194

(22) Filed: Mar. 6, 2009

(65) Prior Publication Data

US 2010/0126616 A1    May 27, 2010

(30) Foreign Application Priority Data

Mar. 7, 2008 (JP) ................................ 2008-057659
May 9, 2008 (JP) ................................ 2008-123068
Nov. 13, 2008 (JP) ................................ 2008-291150

(51) Int. Cl.
*F16L 11/00* (2006.01)

(52) U.S. Cl.
USPC .......... 138/109; 138/122; 285/110; 285/21.1; 285/293.1

(58) Field of Classification Search
USPC ................. 138/121, 122, 109; 285/110, 21.1, 285/293.1
See application file for complete search history.

(56) References Cited

U.S. PATENT DOCUMENTS 2,685,459 A * 8/1954 Panagrossi ................. 285/222.5
4,415,389 A * 11/1983 Medford et al. ................ 156/91
4,763,932 A * 8/1988 Matz et al. ............... 285/148.17
5,429,397 A * 7/1995 Kanao ......................... 285/290.3
5,478,123 A * 12/1995 Kanao ......................... 285/291.1
5,678,610 A * 10/1997 Scarazzo et al. .............. 138/109
6,123,111 A * 9/2000 Nathan et al. ................. 138/109
6,237,969 B1* 5/2001 Amatsutsu .................... 285/357

(Continued)

FOREIGN PATENT DOCUMENTS

CN    2315169 Y    4/1999
DE    2142068 A1   3/1973

(Continued)

OTHER PUBLICATIONS

Chinese Office Action dated Sep. 27, 2010, issued in corresponding Chinese Patent Application No. 200910134689.6.

(Continued)

*Primary Examiner* — James Hook
(74) *Attorney, Agent, or Firm* — Westerman, Hattori, Daniels & Adrian, LLP

(57) ABSTRACT

Provided are a connection structure for connecting corrugated synthetic resin pipes and a corrugated synthetic resin pipe used in the connection structure. The pipe is lightweight, low cost, and simply structured with a small number of components, having sufficient resistance to water and pressure, and excellent sealing performance without the use of robust material or requiring high precision, and capable of being easily connected and manufactured. A first corrugated synthetic resin pipe 1A is provided at an end 10 with a cylindrical insert end 3 formed by adhering a synthetic resin layer 5 to the outer surface of the end 10 so as to fill at least corrugated recesses 2a. A second corrugated synthetic resin pipe 1B is provided at an end 11 with a socket 4 formed by adhering synthetic resin to the outer surface of the end 11 and cylindrically extending the resin outwardly in the axial direction.

11 Claims, 16 Drawing Sheets

(56) References Cited

U.S. PATENT DOCUMENTS

| | | | |
|---|---|---|---|
| 6,318,410 B1 * | 11/2001 | Miyajima et al. | 138/109 |
| 6,971,414 B2 * | 12/2005 | Vohrer | 138/109 |
| 7,083,204 B1 * | 8/2006 | Miller et al. | 285/293.1 |
| 7,108,294 B1 | 9/2006 | Miller et al. | |
| 2004/0094953 A1 * | 5/2004 | Luft et al. | 285/256 |

FOREIGN PATENT DOCUMENTS

| | | |
|---|---|---|
| GB | 1474240 | 5/1977 |
| JP | 57-112187 | 12/1980 |
| JP | 58-31490 | 8/1981 |
| JP | 59-180083 U | 12/1984 |
| JP | 2-300587 A | 12/1990 |
| JP | 2002-139178 A | 5/2002 |
| JP | 2003-113965 A | 4/2003 |
| JP | 2003-161389 A | 6/2003 |

OTHER PUBLICATIONS

Japanese Office Action dated Nov. 15, 2011, issued in corresponding Japanese Patent Application No. 2009-053266.

Decision of Refusal dated Feb. 7, 2012, issued in corresponding Japanese Patent Application No. 2009-053266, 4 pages.

Chinese Office Action dated Oct. 10, 2011, issued in corresponding Chinese Patent Application No. 200910134689.6, with English translation (18 pages).

Chinese Office Action dated May 8, 2012, issued in corresponding Chinese Patent Application No. 200910134689.6, with English translation (9 pages).

Japanese Questioning by Appeal Board dated Jun. 26, 2012, issued in corresponding Japanese JP2009-053266, with English translation (10 pages).

* cited by examiner

Fig. 3
(a)
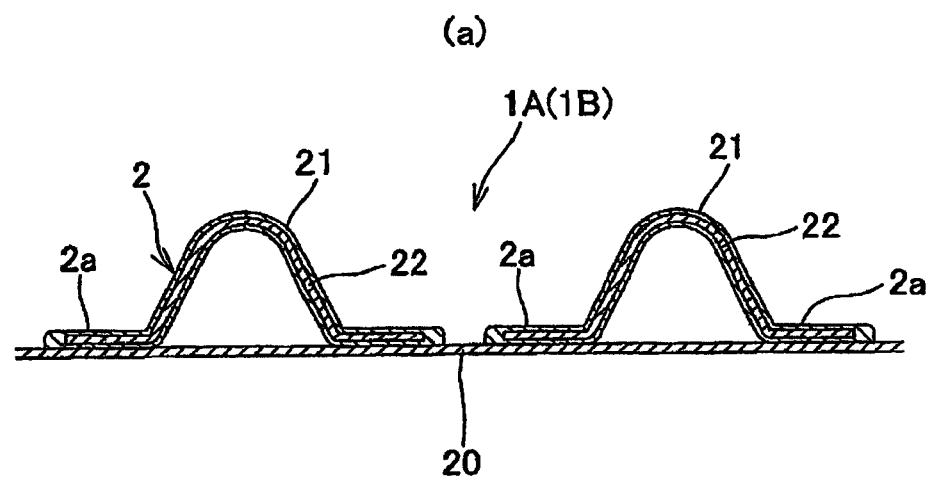
(b)
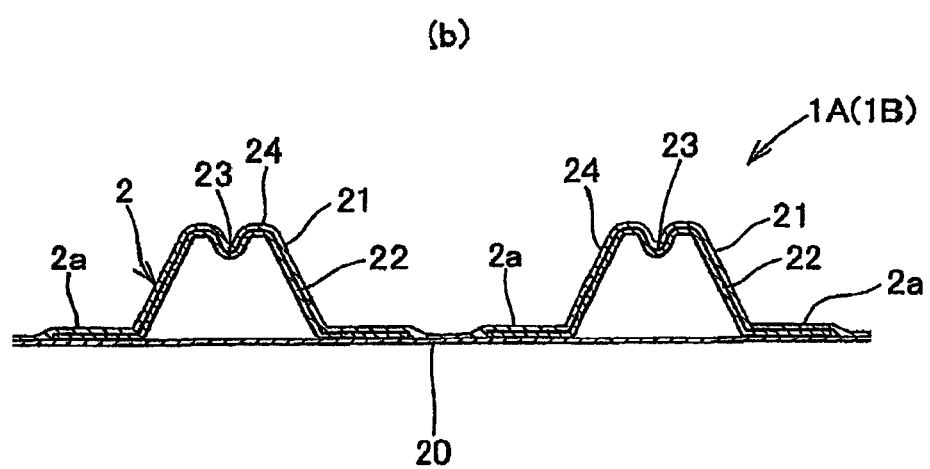

CONNECTION STRUCTURE OF WAVE-SHAPED SYNTHETIC RESIN PIPES, WAVE-SHAPED SYNTHETIC RESIN PIPES USED FOR THE CONNECTION STRUCTURE, AND MANUFACTURING METHOD THEREOF

BACKGROUND OF THE INVENTION

1. Field of the Invention

The present invention relates to a corrugated synthetic resin pipe including a pipe wall having a spirally corrugated shape, which is used, for example, as an underground drainage pipe or a sewage pipe, and also relates to a method for manufacturing the pipe.

2. Description of the Background Art

Conventionally, Hume concrete pipes have been used as underground drainage pipes and sewage pipes. In recent years, however, it has become popular to use corrugated synthetic resin pipes with a body having a substantially flat inner surface and an outer periphery having reinforcing projections spirally arranged thereon. The corrugated synthetic resin pipes are popular because they are as strong as and more durable, lighter in weight, and simpler in construction than Hume pipes. Two such corrugated synthetic resin pipes are connected to each other as follows. First, half joints each having a connecting flange are attached to the facing ends of the pipes with packing sheets set on the inner surfaces of the pipes. Next, the gaps between waterproof blocks and recesses are filled with caulking material. Then, the packing sheets are wound in a fully stretched condition around the pipes and fixed with a vinyl tape or the like. Finally, one half joint is put over the other, and then the flanges of the half joints are fixed to each other by bolts and nuts.

Such a connection structure, however, requires putting the upper and lower half joints, the packing sheets, the caulking material, and other parts together in the field in a specific procedure. This takes a lot of time and effort, thus decreasing the operating efficiency. It is also troublesome to manage the large number of component parts. Furthermore, it is a heavy burden for field workers to move two pipes to specific positions of the packing sheets after the packing sheets are laid on the inner surfaces of the half joints. In addition, the amount of the caulking material to be filled and the degree of stretching the packing sheets in the field vary between individuals, thus causing quality variations.

On the other hand, a new connection structure which makes the connection process easier and faster has been suggested (see, for example, Patent Document 1). In this connection structure, first, connecting flanges are welded to the facing ends of two corrugated synthetic resin pipes. Next, a packing is attached to a contact surface where the flanges are surface-contacted with each other, and finally, the flanges are fixed to each other by bolts and nuts. This connection structure provides higher workability and reliability than the conventional connection structure.

This connection structure, however, has the following problems. The connecting flanges, which are required to be connected using bolts and nuts, decrease operating efficiency. The pipe ends to which the flanges are welded can cause water leakage unless they are made watertight, and deformation of the flange surfaces can also cause water leakage. Avoiding the water leakage requires high quality in welding, and also in the strength, shape, and size of the flanges, which hinders cost reduction. Another problem is that the robust flanges, and the bolts and nuts to connect them inevitably increase the weight of the connected areas. Further another problem is that the connection between the flange surfaces via the packing limits the resistance to water and pressure of the flange surfaces, and requires evenly tightening bolts and nuts, which hinders improving operating efficiency.

Patent Document 1: Japanese Patent Unexamined Publication No. 2002-139178

SUMMARY OF THE INVENTION

In view of the above-described problems, the present invention has an object of providing a corrugated synthetic resin pipe which is lightweight, low cost, and simply structured with a small number of components, having sufficient resistance to water and pressure, and excellent sealing performance without the use of robust material or requiring high precision, and capable of being connected easily in the field. The present invention has another object of providing a method for manufacturing the corrugated synthetic resin pipe efficiently at low cost.

Through detailed studies for solving the problems, the inventors of the present invention have found the following facts and completed the present invention. In the connection of two corrugated synthetic resin pipes, a cylindrical insert end can be formed at an end of one pipe by filling the spiral recesses, which can cause fluid leakage, with a synthetic resin layer. A socket, which is inserted by the insert end, is formed at an end of the other pipe in such a manner as to project in the axial direction. The mere insertion of the insert end into the socket in the axial direction can complete the connection process with stable sealing performance.

The present invention is directed to provide a connection structure for connecting two corrugated synthetic resin pipes at facing ends thereof, the corrugated synthetic resin pipes each including a pipe wall having a spirally corrugated shape, the connection structure comprising: a cylindrical insert end at an end of a first corrugated synthetic resin pipe, the insert end being formed by adhering a synthetic resin layer to the outer surface of the end in such a manner as to fill at least corrugated recesses; and a socket at an end of a second corrugated synthetic resin pipe, the socket being formed by adhering synthetic resin to the outer surface of the end and cylindrically extending the synthetic resin outwardly in the axial direction, wherein the insert end of the first corrugated synthetic resin pipe is inserted into the socket of the second corrugated synthetic resin pipe so as to be connected to each other.

It is preferable to provide a seal member between the insert end and the socket.

It is preferable that the insert end is provided on its outer surface with an annular groove for accommodating the seal member.

It is preferable that, among the socket and the insert end, at least the socket contains reinforcing fiber in a synthetic resin portion thereof.

It is preferable that the reinforcing fiber contained in the synthetic resin portion is either embedded in the form of a woven cloth, a nonwoven cloth, or a resin molding, or added as chips.

It is preferable that the reinforcing fiber is made of glass fiber.

It is preferable that the socket includes a pipe material having a larger diameter than the second corrugated synthetic resin pipe, the pipe material being connected to the end of the second corrugated synthetic resin pipe in such a manner as to project coaxially from the outer surface of the end outwardly in the axial direction, and the pipe material having a synthetic resin layer adhered at least on the inner surface thereof.

It is preferable that the pipe material and the end of the second corrugated synthetic resin pipe are integrated together with the synthetic resin layer disposed therebetween.

The present invention is also directed to provide a corrugated synthetic resin pipe used in the above-described connection structure, the corrugated synthetic resin pipe comprising: a pipe wall having a spirally corrugated shape; a cylindrical insert end at one end, the insert end being formed by adhering a synthetic resin layer to the outer surface of the one end in such a manner as to fill at least corrugated recesses; and a socket at the other end, the socket being formed by adhering synthetic resin to the outer surface of the other end and cylindrically extending the synthetic resin outwardly in the axial direction.

It is preferable that the insert end at the one end is provided on its outer surface with an annular groove for accommodating the seal member. It is preferable that, among the socket and the insert end, at least the socket contains reinforcing fiber in a synthetic resin portion thereof. It is particularly preferable that the reinforcing fiber contained in the synthetic resin portion is either embedded in the form of a woven cloth, a nonwoven cloth, or a resin molding, or added as chips. It is preferable that the reinforcing fiber is made of glass fiber. It is preferable that the socket includes a pipe material having a larger diameter than the corrugated synthetic resin pipe, the pipe material being connected to the end of the corrugated synthetic resin pipe in such a manner as to project coaxially from the outer surface of the end outwardly in the axial direction, and the pipe material having a synthetic resin layer adhered at least on the inner surface thereof. It is preferable that the pipe material and the other end are integrated together with the synthetic resin layer disposed therebetween.

It is also preferable that the socket includes a pipe material having a larger diameter than the corrugated synthetic resin pipe and projecting coaxially from the outer surface of the other end outwardly in the axial direction, and that the synthetic resin material for the synthetic resin layer is injected into at least the gaps between the pipe material and the corrugated synthetic resin pipe.

It is preferable that the pipe material has a pipe wall formed in a spirally corrugated shape similar to the pipe wall of the corrugated synthetic resin pipe.

The present invention is also directed to provide a method for manufacturing the above-described corrugated synthetic resin pipe, the method comprising: forming the pipe wall of the corrugated synthetic resin pipe; forming the pipe material having a larger diameter than the corrugated synthetic resin pipe on the other end of the corrugated synthetic resin pipe thus formed, the pipe material being formed coaxially with the corrugated synthetic resin pipe with support of a guide member from the radial outside; sealing the pipe material thus formed at inner and outer ends in the axial direction using sealing chucks; and injecting the synthetic resin material for forming the synthetic resin layer into the gaps between the pipe material thus sealed and the corrugated synthetic resin pipe.

In the manufacturing method, it is preferable that at least one of the sealing chucks has an inlet for injecting the synthetic resin material.

In the manufacturing method, it is preferable that during formation of the pipe material, continuously fed steel is deformation-processed to have an M-shaped cross section and then spirally discharged, and at the same time, an outer wound tape is continuously spirally discharged so as to be adhered to the outer surface of the steel and integrated in the axial direction, thereby providing the pipe material.

According to the present invention, the pipe connection process is performed only by inserting an insert end into a socket in the axial direction. The cylindrical insert end is formed by adhering a synthetic resin layer to the outer surface of an end of one pipe. The socket is formed by adhering synthetic resin to the outer surface of an end of another pipe and cylindrically extending the resin outwardly in the axial direction. This connection structure eliminates the need to evenly tighten bolts and nuts, unlike the conventional structure using connecting flanges, thereby significantly improving operating efficiency. In this mating structure between the socket and the insert end, the socket encases the insert end without the use of robust material or requiring high precision, thereby providing sufficient resistance to water and pressure, and excellent sealing performance. This allows the pipes to be lighter in weight and lower cost and to be connected more easily than the conventional pipes which require fixing the connecting flanges water-tightly and precisely.

The insert end is provided on its outer surface with an annular groove for accommodating the seal member. This simplifies the connection of the pipes with the seal member accommodated in the annular groove, thereby improving workability.

Among the socket and insert end, at least the socket contains reinforcing fiber in a synthetic resin portion thereof. This decreases the weight and cost, and increases the strength of the synthetic resin socket, thereby providing a connection structure having higher resistance to water and pressure as compared with the socket having a large-diameter pipe material, which will be described later.

The reinforcing fiber contained in the synthetic resin portion is embedded in the form of a woven cloth, a nonwoven cloth, or a resin molding. This increases the strength of the projecting socket. The reinforcing fiber contained in the synthetic resin portion is added as chips. This increases the strength of the entire socket, and resistance to water and pressure.

The socket includes a pipe material having a larger diameter than the second corrugated synthetic resin pipe, the pipe material being connected to the end of the second corrugated synthetic resin pipe in such a manner as to project coaxially from the outer surface of the end outwardly in the axial direction, and the pipe material having a synthetic resin layer adhered at least on the inner surface thereof. This increases the strength of the socket, thereby providing the connection structure having higher resistance to water and pressure.

The pipe material and the end of the second corrugated synthetic resin pipe are integrated together with the synthetic resin layer disposed therebetween. This increases the strength of the socket, and prevents displacement between the pipe material and the pipe end in the axial direction, thereby improving sealing performance.

The socket includes a pipe material having a large diameter and projecting coaxially with the corrugated synthetic resin pipe, and the synthetic resin material is injected into the gaps between the pipe material and the corrugated synthetic resin pipe. This increases the strength of the socket, thereby providing the connection structure having higher resistance to water and pressure.

The pipe material has a pipe wall formed in a spirally corrugated shape similar to the pipe wall of the corrugated synthetic resin pipe. This increases the strength of the pipe material. The synthetic resin layer can be adhered to entirely coat the outer surface of the pipe material, but can alternatively be adhered in such a manner that the pipe material is partially exposed. This can reduce the weight and material cost. In addition, the pipe wall of the pipe material has the same appearance as the pipe wall of the corrugated synthetic resin pipe, thereby improving unity between the joint and the entire pipe, and hence, their appearance.

According to the method for manufacturing the corrugated synthetic resin pipe of the present invention, the pipe material as a component of the socket is formed immediately after the formation of the pipe wall of the corrugated synthetic resin pipe, and the synthetic resin material is injected into the gaps between the pipe material sealed using the sealing chucks and the corrugated synthetic resin pipe. This allows the corrugated synthetic resin pipe and the socket to be formed integrally at the same time, thereby improving production efficiency and decreasing cost.

At least one of the sealing chucks has an inlet for injecting the synthetic resin material. This facilitates the injecting of the synthetic resin material.

During formation of the pipe material, continuously fed steel is deformation-processed to have an M-shaped cross section and then spirally discharged, and at the same time, an outer wound tape is continuously spirally discharged so as to be adhered to the outer surface of the steel and integrated in the axial direction, thereby providing the pipe material. This continuous integral molding provides the high-strength pipe material.

BRIEF DESCRIPTION OF THE DRAWINGS

FIG. 3A is a longitudinal sectional view of the essential part of a pipe wall, and FIG. 3B is a longitudinal sectional view of a modified example of the pipe wall according to the first embodiment.

DESCRIPTION OF THE PREFERRED EMBODIMENTS

Embodiments of the present invention will be described in detail as follows based on the attached drawings.

Figure 1:
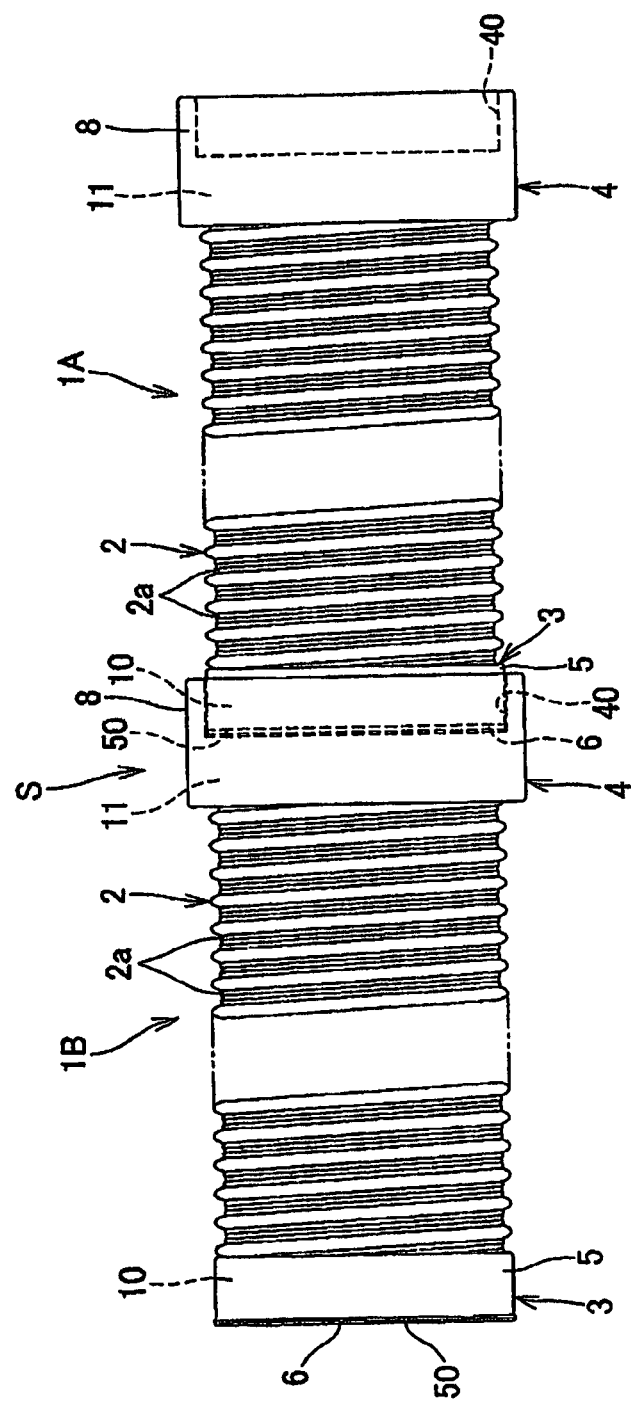
FIG. 1 is an overall view of a joint structure according to a first embodiment of the present invention.
Figure 4:
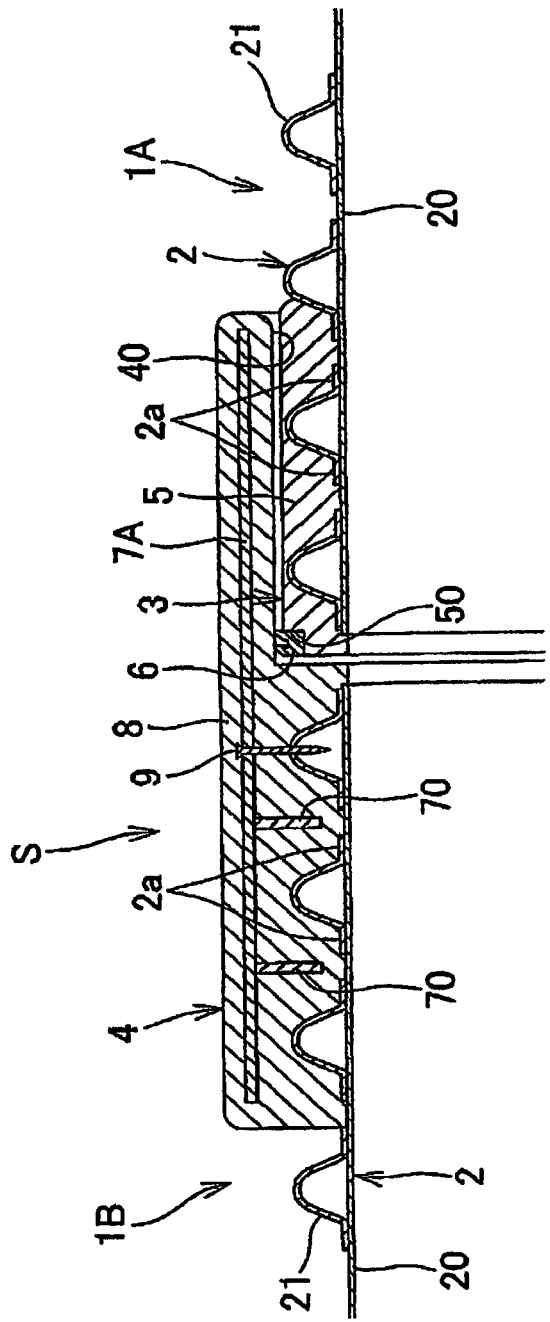
FIG. 4 is a longitudinal sectional view of a modified example of a socket according to the first embodiment.
Figure 5:
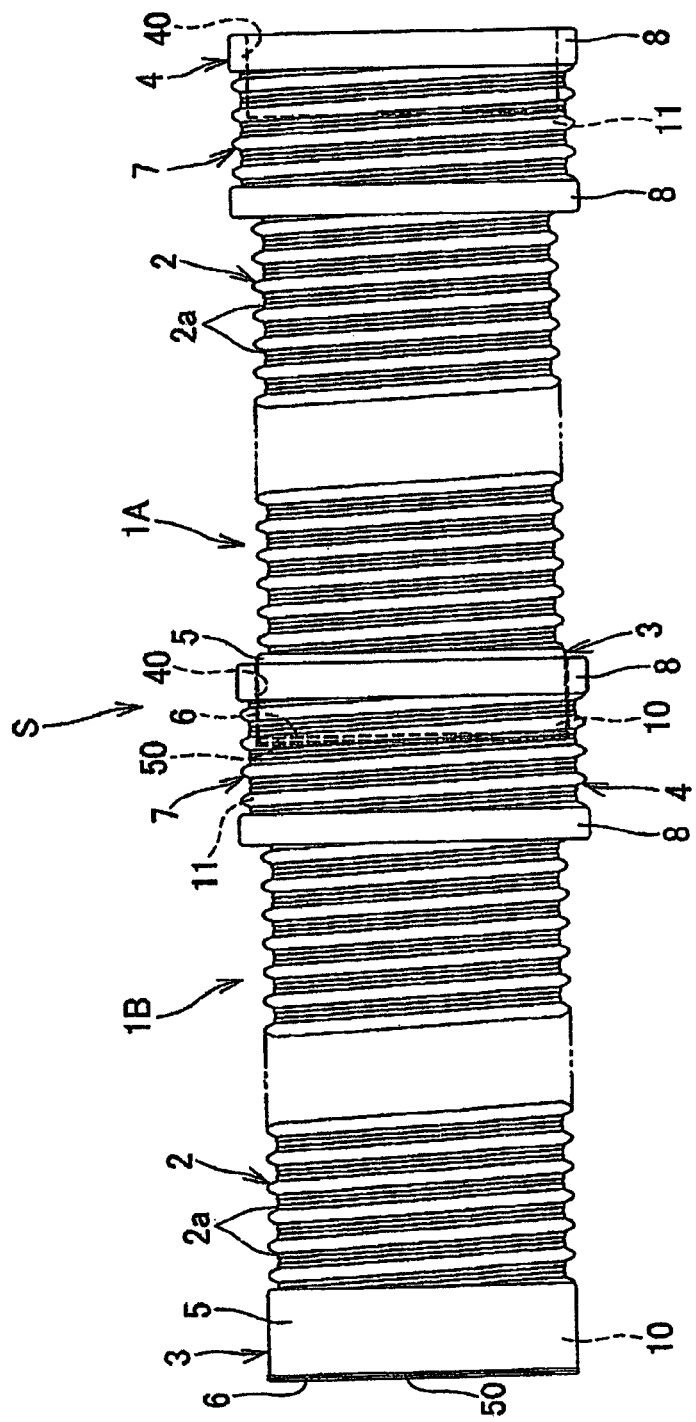
FIG. 5 is an overall view of a joint structure according to a second embodiment of the present invention.
Figure 6:
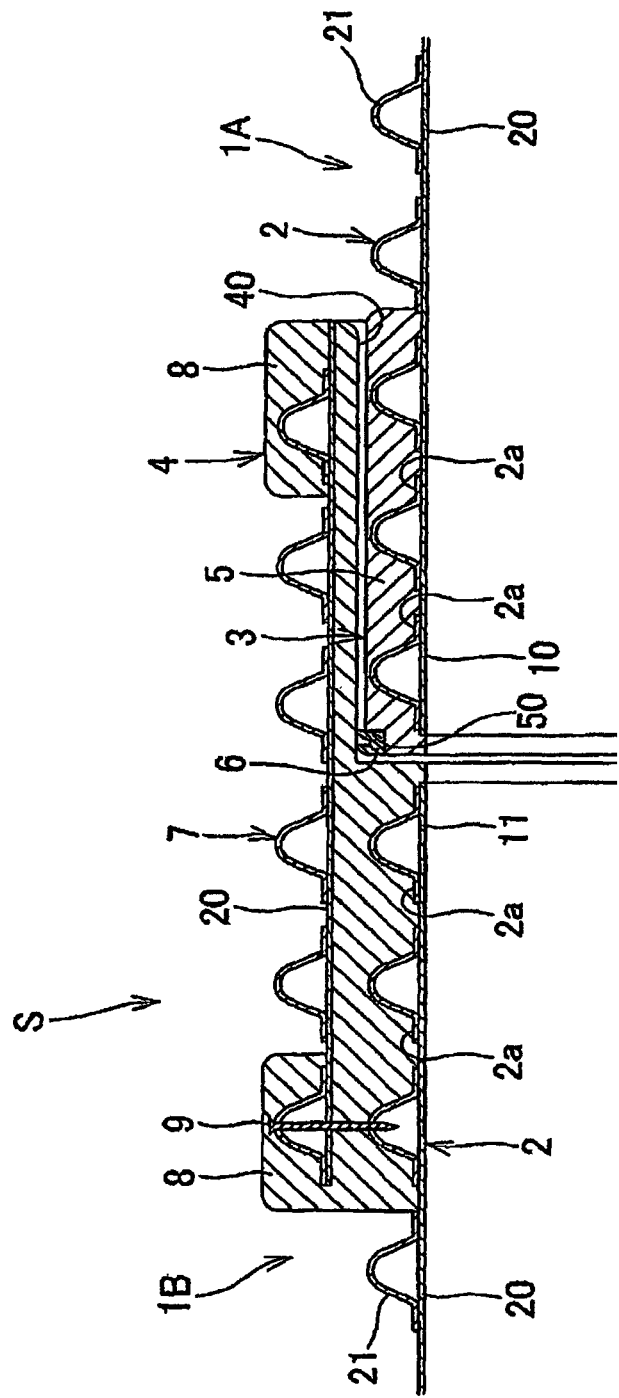
FIG. 6 is a longitudinal sectional view of the essential part of the joint structure according to the second embodiment.
Figure 7:
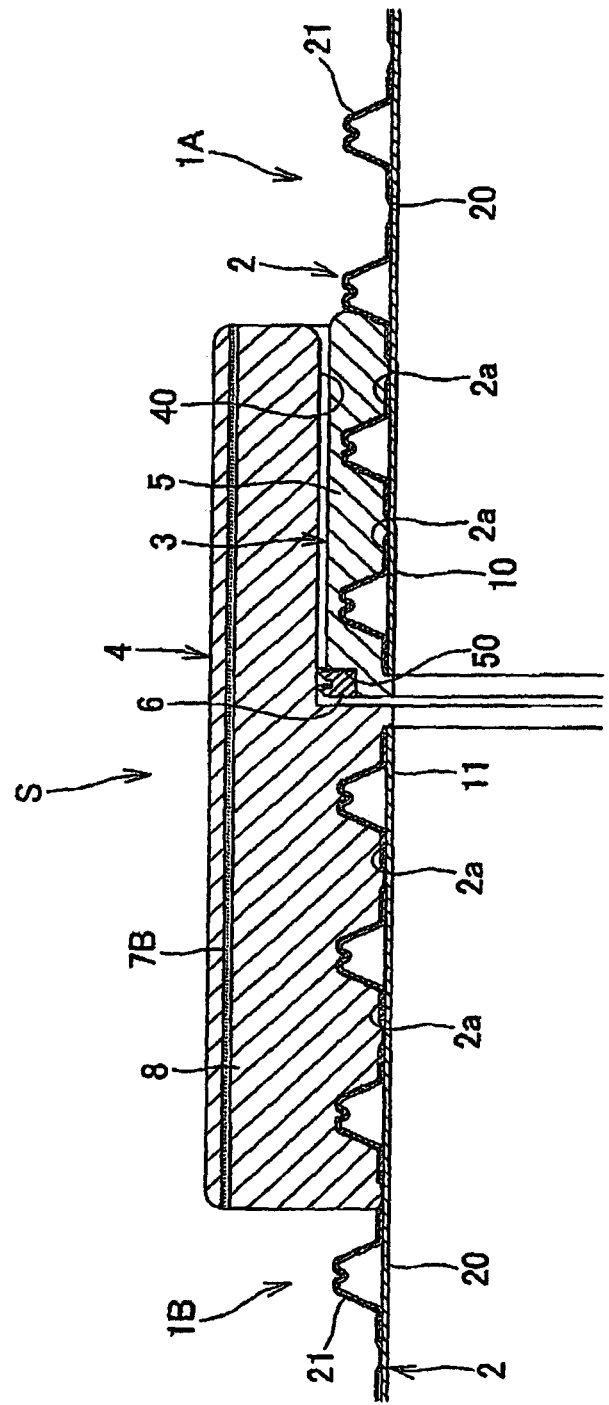
FIG. 7 is a longitudinal sectional view of the essential part of a joint structure according to a third embodiment of the present invention.
Figure 8:
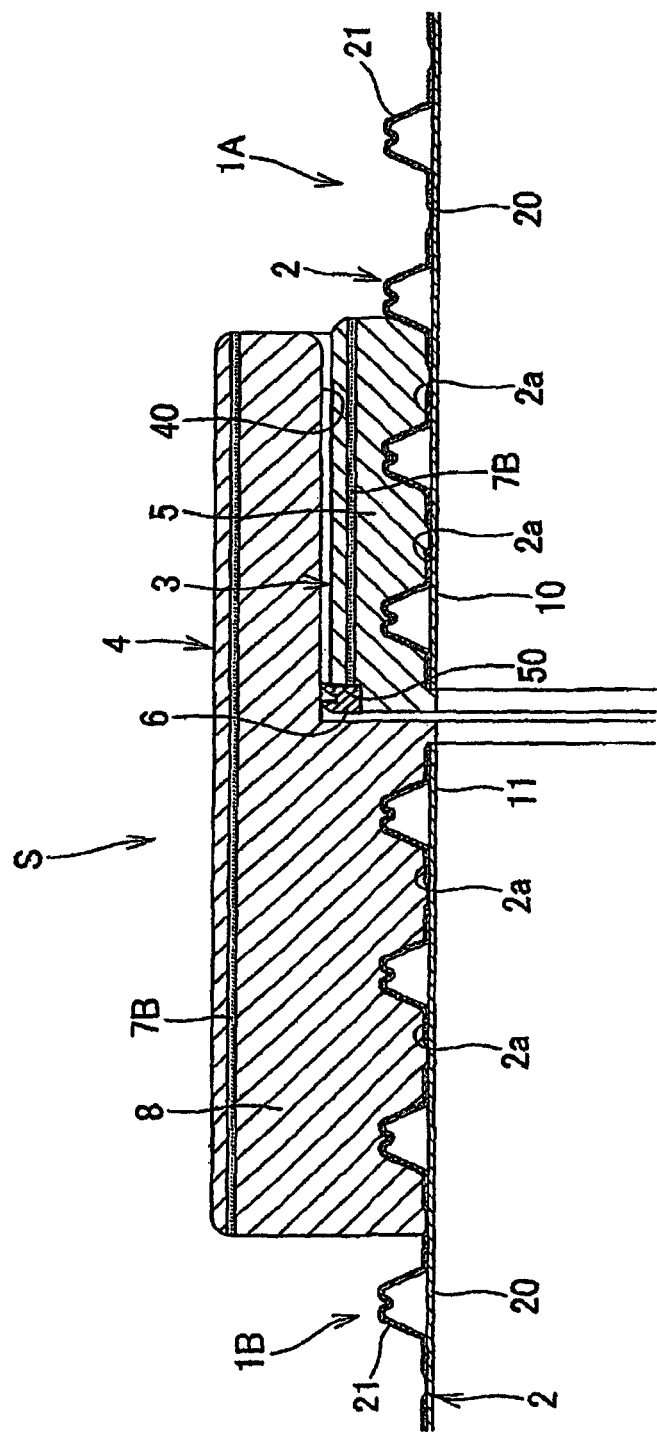
FIG. 8 is a longitudinal sectional view of a modified example of an insert end according to the third embodiment.

FIG. 1 is an explanatory drawing showing a connection structure S for connecting corrugated synthetic, resin pipes 1A and 1B of the present invention. FIGS. 1 to 4 show a first embodiment, FIGS. 5 and 6 show a second embodiment, FIGS. 7 and 8 show a third embodiment, and FIGS. 11 to 16 show a fourth embodiment of the present invention. The drawings include corrugated synthetic resin pipes 1A, 1B, and 1C, a pipe wall 2, an insert end 3, and a socket 4.

Figure 2:
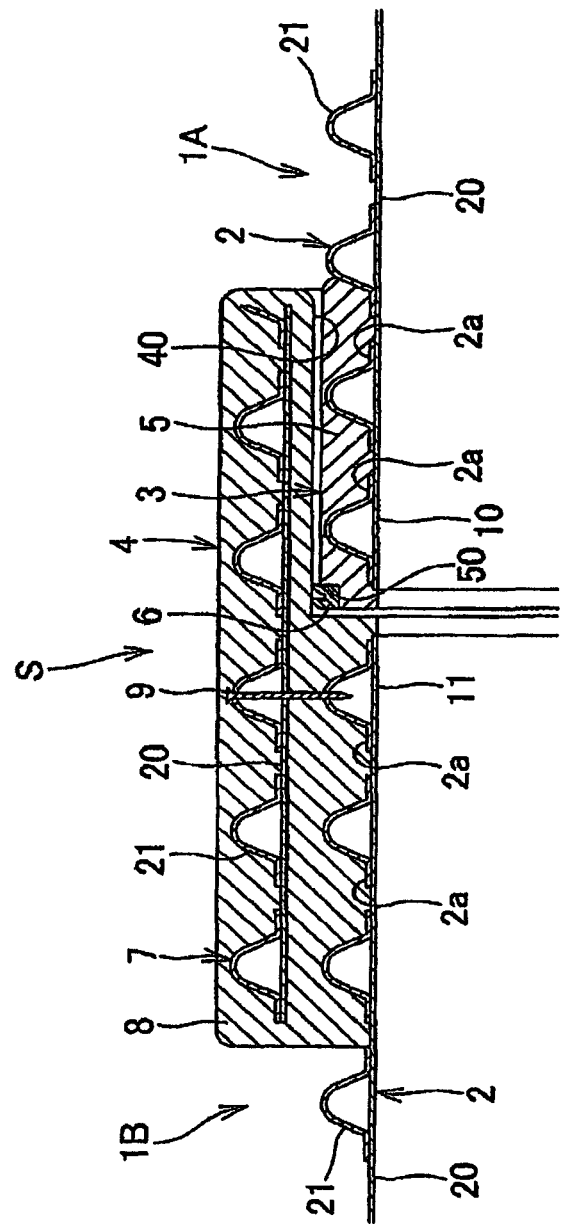
FIG. 2 is a longitudinal sectional view of the essential part of the joint structure according to the first embodiment.

As shown in FIGS. 1 and 2, the connection structure S for connecting corrugated synthetic resin pipes of the present invention allows two corrugated synthetic resin pipes 1A and 1B each including the pipe wall 2 having a spirally corrugated shape to be connected to each other at their ends. In the present embodiment, the corrugated synthetic resin pipes 1A and 1B have the same structure: each pipe has an insert end 3 at one end 10 (left end in FIG. 1), and a socket 4 at the other end 11 (right end in FIG. 1). The connection structure of the present invention, however, is not limited to this example but the facing ends of the pipes include the insert end 3 and the socket 4 while the other ends do not include the insert end and the socket 4.

First, a first embodiment will be described based on FIGS. 1 to 4.

The corrugated synthetic resin pipes 1A and 1B include the spirally corrugated pipe wall 2, and are provided at the one end 10 (left end in FIG. 1) with the cylindrical insert end 3, and at the other end 11 (right end in FIG. 1) with the socket 4 as shown in FIG. 2. The insert end 3 is formed by adhering a synthetic resin layer to the outer surface of the one end 10 in such a manner as to fill corrugated recesses 2a. The socket 4 is formed by adhering synthetic resin to the outer surface of the other end 11 and cylindrically extending the resin outwardly in the axial direction (rightward in FIGS. 1 and 2).

As shown in FIG. 3A, the pipe wall 2 of each pipe has a series of waves with peaks and valleys of substantially triangular, substantially arc-shaped, or trapezoidal, and the portions including the valleys between the peaks form recesses 2a. In the present embodiment, the pipe wall 2 includes a body 20 made of synthetic resin. The body 20 has a substantially flat inner surface and an outer periphery having reinforcing projections 21 spirally arranged thereon. The reinforcing projections 21 are made of a resin molding (for example, coated steel) containing steel 22 and are substantially triangular or substantially arc-shaped. The body 20 and the reinforcing projections 21 forming the peaks can be efficiently integrated with each other as follows. The partial molding of the body 20 is melt extruded and spirally wound around the axis of rotation so as to be sequentially welded. At the same time, the reinforcing projections 21 are spirally fed onto the partial molding.

The reinforcing projections 21 forming the peaks may not contain the steel 22 and may be formed of only a resin layer. The shape of the peaks and valleys is not particularly limited; it may be substantially V-shaped, substantially rectangular U-shaped, substantially circular, substantially oval, substantially square, polygonal, irregular, or other shaped. The body 20 is extended from the valleys to the inner periphery side of the peaks so as to make the pipe inner surface flat in the present embodiment. Alternatively, however, the body 20 may be omitted and the reinforcing projections 21 may be connected to each other so that the inner surface of each pipe is also spirally corrugated with peaks and valleys.

It is also preferable to provide a concave depression 23 at the top of each peak as shown in FIG. 3B. The concave depressions 23 disperse the pressure (for example, earth pressure) applied on the peaks, thereby improving not only the strength and rigidity of the peaks, but also the pressure resistance of the entire pipe wall 2. The presence of the concave depressions 23 often causes fluid leakage in the conventional pipe connection structure; however, the connection structure of the present invention causes no leakage regardless of the presence of the concave depressions 23. The example of FIG. 3B further includes an outer surface layer 24 adhered along the outer surface of the substantially M-shaped reinforcing projections 21 made of coated steel.

Examples of the synthetic resin material used for the peaks and valleys of the pipe wall 2, more specifically, for the body 20, the reinforcing projections 21, and the outer surface layer 24 include polyolefin such as polyethylene and polypropylene, vinyl chloride, synthetic rubber, and flexible resin.

As shown in FIG. 2, the insert end 3 at the one end 10 of each of the corrugated synthetic resin pipes 1A and 1B is formed by adhering a synthetic resin layer 5 to the outer surface of the one end 10 in such a manner as to fill at least the corrugated recesses 2a. Thus, the insert end 3 is cylindrically shaped having a substantially flat outer surface in the axial direction so as to be close contact with the inner circumference surface of the socket 4, which will be described later. The synthetic resin layer 5 is formed by enclosing the one end 10 with a forming die, injecting synthetic resin material thereinto, and curing the resin. In the present invention, however, the synthetic resin layer 5 can be separately molded, attached to the end 10, and integrally thermally fused thereto, or can be adhered by other methods.

The insert end 3 can alternatively have a small diameter than the pipe wall 2. To achieve this structure, the one end 10 is press-deformed in the diameter-reducing direction to crush the reinforcing projections 21 in such a manner that the recesses 2a have a predetermined depth, and then the synthetic resin layer 5 is adhered thereon. This also allows a reduction in the size of the socket 4 at the other end 11, and hence, the size of the entire connected area including the insert end 3 and the socket 4.

The synthetic resin material used for the synthetic resin layer 5 can be either foamed or non-foamed. For example, it is possible to use olefin resin such as polyethylene resin and polypropylene resin. Examples of the foamed synthetic resin include polystyrene foam, polyethylene foam, rigid polyurethane foam, flexible polyurethane foam, rigid vinyl chloride foam, urea-formaldehyde foam, phenolic foam, acrylic foam, and cellulose acetate foam. The synthetic resin layer 5 is adhered in such a manner that the peaks at the end 10 are completely embedded in the present embodiment. Alternatively, the peaks may be partially exposed to a degree to maintain a substantially flat surface, or in the contrary, the synthetic resin layer 5 can be adhered thick enough to make the outer surface outside the tops of the peaks.

As shown in FIG. 2, the socket 4 includes a pipe material 7 having a larger diameter than the corrugated synthetic resin pipe 1B. The pipe material 7 is connected to the other end 11 using a fixing screw 9 in such a manner as to project coaxially from the outer surface of the other end 11 outwardly in the axial direction. There is also provided a synthetic resin layer 8, which is adhered to fill the gaps between the pipe material 7 and the corrugated synthetic resin pipe 1B in such a manner that the pipe material 7 is embedded completely. The inner circumference surface of the cylindrical portion of the pipe material 7 projecting outwardly in the axial direction is substantially flat in the axial direction so as to function as an abutment surface 40 along which the insert end 3 is inserted. The fixing screw 9 is used to fix the positions of the pipe material 7 and the other end 11 until the synthetic resin layer 8 is adhered. The fixing screw 9 is preferably fixed in the peaks without penetrating the pipe wall 2, but can be omitted by instead using another member for temporary fixation.

In the same manner as the insert end 3, the socket 4 is formed by enclosing the other end 11 and the pipe material 7 with a forming die, injecting synthetic resin material thereinto, and curing the resin. Alternatively, however, the synthetic resin layer 8 including the pipe material 7 can be separately molded, attached to the end 11, and integrally thermally fused thereto, or can be adhered by other methods. The synthetic resin layer 8 can be made of the same synthetic resin material as used in the insert end 3.

Similar to the corrugated synthetic resin pipes 1A and 1B, the pipe material 7 is composed of a pipe portion having a series of waves with peaks and valleys to significantly increase the strength of the socket 4. The peaks and valleys are substantially triangular, substantially arc-shaped, or trapezoidal. The pipe portion used for the pipe material 7 has the same wave structure as the corrugated synthetic resin pipes 1A and 1B in the present embodiment; however, the present invention is not limited to this structure. For example, the pipe material 7 having corrugation peaks with the concave depressions 23 at their tops as shown in FIG. 3B can be used for the corrugated synthetic resin pipe 1B having the pipe wall 2 of FIG. 3A. Conversely, the pipe material 7 having corrugation peaks with no concave depressions at their tops as shown in FIG. 3A can be used for the corrugated synthetic resin pipe 1B having the pipe wall 2 of FIG. 3B. It is also possible to use a pipe material 7A, which is composed of a straight pipe portion as shown in FIG. 4. In the example of FIG. 4, the inner circumference surface of the straight pipe portion is provided with engaging protrusions 70, which are engaged with the corrugation peaks of the pipe wall 2 so as to function as retainers, thereby improving the strength of the socket 4.

The pipe materials 7 (7A) are mainly used to maintain the strength of the cylindrically portion of the socket 4 that projects outwardly so as to receive the insert end 3. However, it is possible to omit the insert member such as the pipe material 7 and to form the socket 4 having only the synthetic resin layer 8 by selecting its size and material that can maintain the strength of the cylindrically portion. The pipe materials 7 (7A) and the outer peripheral surface of the pipe wall 2 are firmly integrated together with the synthetic resin layer 8 disposed therebetween. The synthetic resin layer 8 as a component of the socket 4 may be reinforced by embedding a reinforcing material such as reinforced fiber or net therein if necessary.

Both the insert end 3 and the socket 4 are formed substantially flat in the axial direction in the present embodiment; however, the present invention is not limited to such shape. For example, the insert end 3 may be tapered toward the open end, and the socket 4 may have an inner circumference surface which is tapered substantially at the same angle and substantially parallel to the insert end 3. As another example, either the outer diameter of the insert end or the inner diameter of the socket may be curved in the axial direction.

Between the insert end 3 and the socket 4, there is provided an O-ring 6 as a seal member as shown in FIG. 2. More specifically, the insert end 3 is provided on its outer surface with an annular groove 50 for accommodating the O-ring 6, so that the pipes can be connected to each other with the O-ring 6 in the annular groove 50. The annular groove 50 in which the O-ring 6 is accommodated is formed as a notch at the tip edge of the insert end 3 in the present embodiment, but may alternatively be formed at the proximal edge opposite to the insert end 3, at a position between the tip edge and the proximal edge, or on the socket 4 side. The shape and structure of the seal member such as the O-ring 6 is not limited as long as sealing is ensured between the insert end 3 and the socket 4. Thus, seal members of various shapes and structures can be applied at a proper position. Instead of separately providing the O-ring 6, an annular protrusion as a seal member can be formed integrally with the insert end 3 or the socket 4.

A second embodiment will be described as follows based on FIGS. 5 and 6.

In the present embodiment, the synthetic resin layer 8 is adhered in such a manner that the pipe material 7 as a component of the socket 4 is partially exposed. The pipe material 7 is embedded in the synthetic resin layer 8 only on the tip side, which requires strength and on the proximal side, which is important in terms of the integration between the pipe material 7 and the pipe wall 2, and is exposed at the remaining portion. Exposing the pipe material 7 in this manner can reduce the weight and material cost. When the pipe material 7 has the same outer structure as the pipe wall 2 as in the present embodiment, the exposed portion of the socket 4 has the same appearance as the pipe wall 2, thereby improving unity between the joint and the entire pipe, and hence, their appearance. Other configurations and modified examples are the same as those of the first embodiment described above. Therefore the same components are denoted by the same reference numerals, and thus a detailed description thereof will be omitted.

A third embodiment will be described as follows based on FIGS. 7 and 8.

In the present embodiment, instead of the pipe material 7, the socket 4 contains reinforcing fiber 7B in its synthetic resin portion (synthetic resin layer 8). The reinforcing fiber 7B is embedded in the form of a woven cloth, a nonwoven cloth, or a resin molding in the present embodiment. This structure significantly reduces the weight and cost, while maintaining the strength, as compared with the example using the pipe material 7. The reinforcing projections 21 of each pipe have the concave depressions 23 at the tops of the peaks as shown in FIG. 3B in the present embodiment. Needless to say, however, the concave depressions 23 can be applied to various corrugated synthetic resin pipes in the same manner as in the first embodiment.

The reinforcing fiber is preferably glass fiber. When the socket 4 is formed of synthetic resin, the woven cloth, nonwoven cloth or resin molding used as the reinforcing fiber 7B can be set in a forming die so as to embed and mold the socket 4. Alternatively, the socket 4 can be molded in two batches: one for inner side and the other for the outer side. When the first molding of the inner side is over, the woven cloth, nonwoven cloth, or resin molding as the reinforcing fiber 7B is adhered to the outer surface, and then, the second molding is applied thereon so as to achieve embedding and molding.

The woven cloth, nonwoven cloth or resin molding as the reinforcing fiber 7B can be applied around nearly the entire perimeter of the socket 4. Alternatively, one or more woven cloths, nonwoven cloths or resin moldings can be applied to only a part of the perimeter. The resin molding can be formed in a sheet-like or cylindrical form. In term of adhesion, the resin used for the resin molding is preferably the same as the resin used for synthetic resin layer 8 which is a component of the socket 4. It is also possible that the woven cloth, nonwoven cloth, or resin molding as the reinforcing fiber 7B can be pasted on the outer surface of the socket 4.

Figure 9:
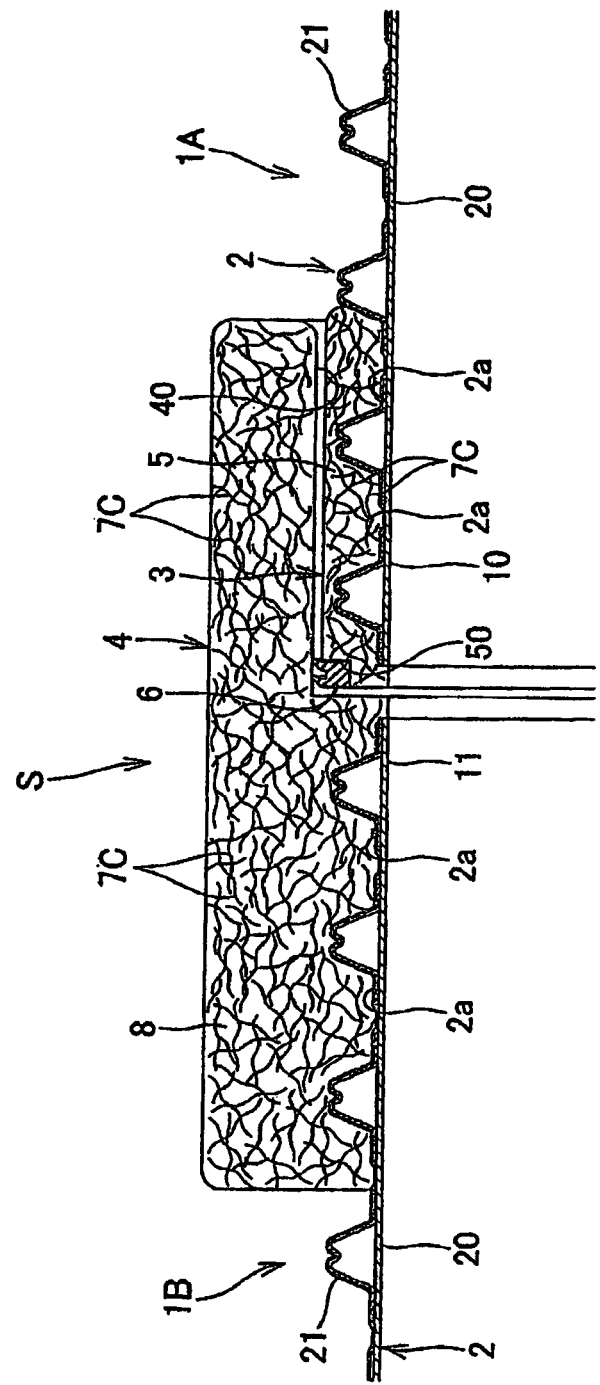
FIG. 9 is a longitudinal sectional view of a modified example formed by adding reinforcing fiber chips according to the third embodiment.
Figure 10:
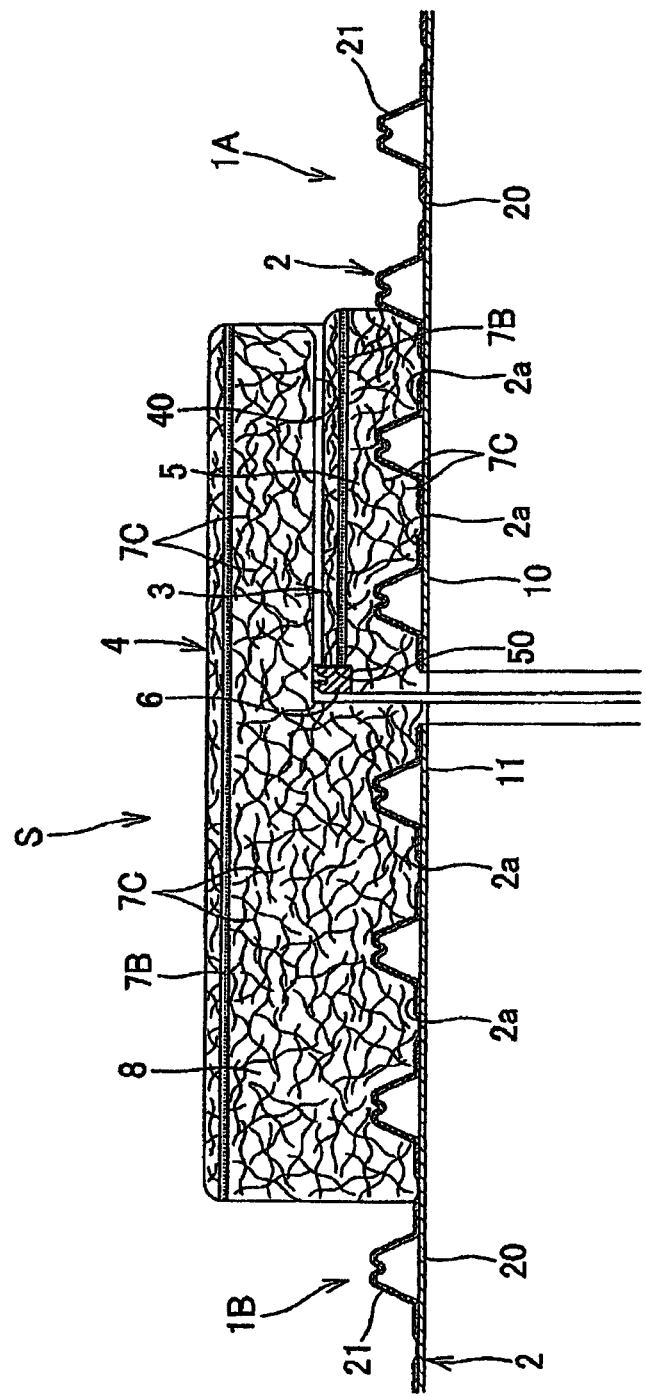
FIG. 10 is a longitudinal sectional view of a modified example which is formed by adding reinforcing fiber in the form of a woven cloth, a nonwoven cloth, or a resin molding to the modified example of FIG. 9.

FIG. 8 shows an example in which the reinforcing fiber 7B is contained not only in the synthetic resin layer 8 of the socket 4 but also in the synthetic resin layer 5 of the insert end 3. Similar to the socket 4, the woven cloth, nonwoven cloth, or resin molding used as the reinforcing fiber 7B can be set in a forming die so as to embed and mold the insert end 3. It goes without saying that the insert end 3 can contain the reinforcing fiber 7B as in the present embodiment, and the socket 4 can be provided with the pipe material 7 of the first embodiment instead of the reinforcing fiber 7B, or can be added with no reinforcing member. The socket 4 or the insert end 3 contains the reinforcing fiber 7B in the form of a woven cloth, nonwoven cloth, or resin molding in the present embodiment. It is also preferable, as shown in FIG. 9, to add reinforcing fiber chips 7C (short cut fiber) to the synthetic resin used for the insert end 3 and the socket 4 in such a manner as to be contained in the entire synthetic resin portion, thereby improving the strength of the entire insert end 3 or the entire socket 4. It is also preferable, as shown in FIG. 10, to combine the reinforcing fiber chips 7C with the reinforcing fiber 7B in the form of the woven cloth, nonwoven cloth, or resin molding so as to further improve the strength. Other configurations and modified examples (including the position of the O-ring) are the same as those of the first embodiment described above. Therefore, the same components are denoted by the same reference numerals, and thus a detailed description thereof will be omitted.

A fourth embodiment will be described as follows based on FIGS. 11 to 16.

Figure 11:
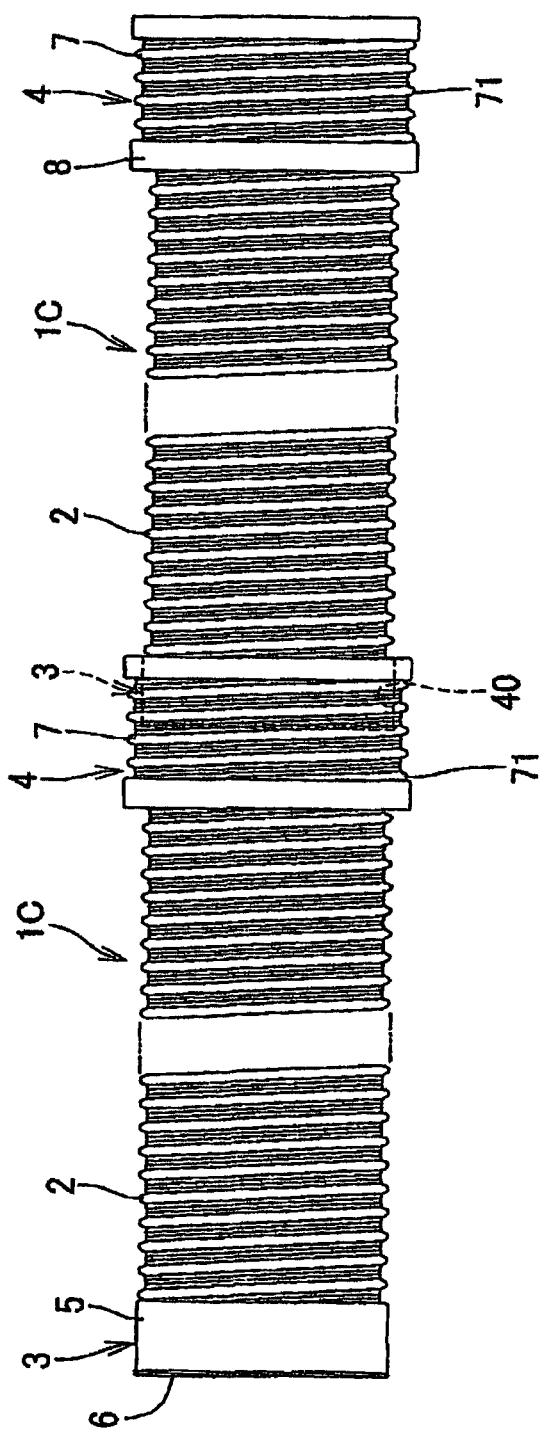
FIG. 11 is an overall view showing a state in which corrugated synthetic resin pipes according to a fourth embodiment of the present invention are connected to each other.
Figure 12:
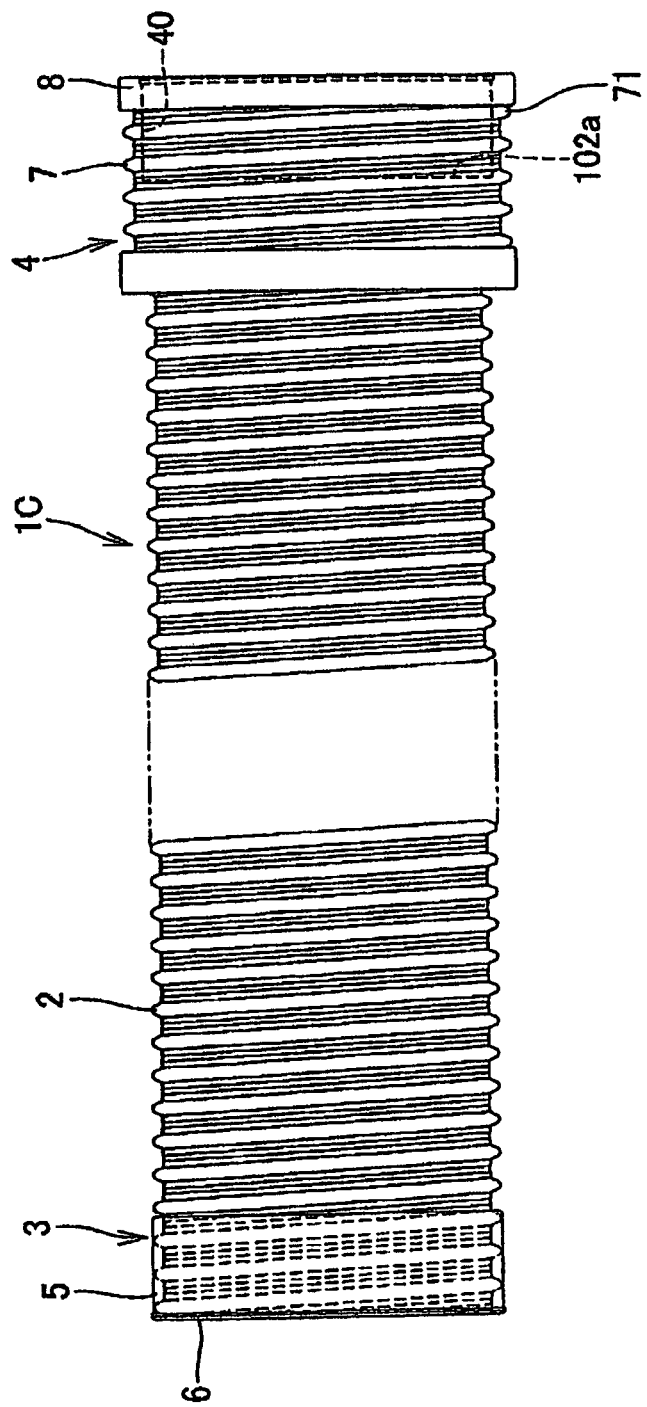
FIG. 12 is an overall view of the corrugated synthetic resin pipe according to the fourth embodiment.

The corrugated synthetic resin pipe 1C of the present embodiment includes the spirally corrugated pipe wall 2, and are provided at one end (left end in FIGS. 11 and 12) with the cylindrical insert end 3, and at the other end 102a (right end in FIGS. 11 and 12) with the socket 4 as shown in FIGS. 11 and 12. The insert end 3 is formed by adhering the synthetic resin layer 5 to the outer surface of the one end in such a manner as to fill at least the corrugated recesses. The socket 4 is formed by adhering the synthetic resin layer 8 to the outer surface of the other end and cylindrically extending the resin outwardly in the axial direction. When a plurality of corrugated synthetic resin pipes 1C are connected to each other, the insert end 3 of a first corrugated synthetic resin pipe 1C (right side in FIGS. 11 and 12) is inserted into the socket 4 of a second corrugated synthetic resin pipe 1C (left side in FIGS. 11 and 12). In the present invention, the socket 4 includes the pipe material 7 having a larger diameter than the corrugated synthetic resin pipe 1C and projecting coaxially from the outer surface of the other end 102a outwardly in the axial direction as shown in the longitudinal sectional view of FIG. 13. The synthetic resin material for the synthetic resin layer 8 is injected into at least the gaps between the pipe material 7 and the corrugated synthetic resin pipe 1C.

Figure 13:
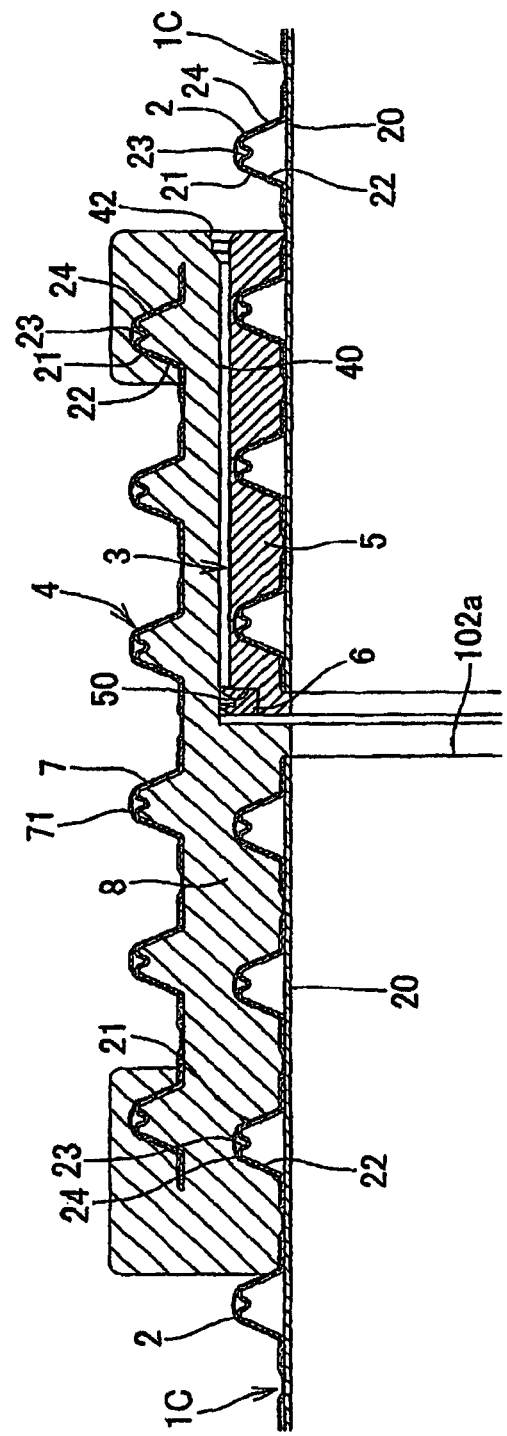
FIG. 13 is an enlarged longitudinal sectional view of the connected area of the corrugated synthetic resin pipes according to the fourth embodiment.

As shown in FIG. 13, the pipe wall 2 has a series of waves with peaks and valleys of substantially triangular, substantially arc-shaped, or trapezoidal, the portions including the valleys between the peaks form recesses. In the present embodiment, the body 20 of synthetic resin has a substantially flat inner surface and an outer periphery having reinforcing projections 21 spirally arranged thereon. The reinforcing projections 21 are made of a resin molding (for example, coated steel) containing steel 22 and are substantially triangular or substantially arc-shaped. The reinforcing projections 21 may not contain the steel 22 and may be formed of only a resin layer. The shape of the peaks and valleys is not particularly limited; it may be substantially V-shaped, substantially rectangular U-shaped, substantially circular, substantially oval, substantially square, polygonal, irregular, or other shaped. The body 20 is extended from the valleys to the inner periphery side of the peaks so as to make the pipe inner surface flat in the present embodiment. Alternatively, however, the body 20 may be omitted and the reinforcing projections 21 may be connected to each other so that the inner surface of each pipe is also spirally corrugated with peaks and valleys. It is also preferable to provide the concave depression 23 at the top of each peak of the steel 22. The concave depressions 23 disperse the pressure (for example, earth pressure) applied on the peaks, thereby improving not only the strength and rigidity of the peaks, but also the pressure resistance of the entire pipe wall 2. The present embodiment further includes the outer surface layer 24 adhered along the outer surface of the steel 22. Examples of the synthetic resin material used for the peaks and valleys of the pipe wall 2, more specifically, for the body 20 and the outer surface layer 24 include polyolefin such as polyethylene and polypropylene, vinyl chloride, synthetic rubber, and flexible resin.

As shown in FIGS. 12 and 13, the insert end 3 at the one end is formed by adhering the synthetic resin layer 5 to the outer surface of the one end in such a manner as to fill at least the corrugated recesses. Thus, the insert end 3 is cylindrically shaped having a substantially flat outer surface in the axial direction so as to be close contact with the inner circumference surface of the socket 4 of the other end. The synthetic resin layer 5 as a component of the insert end 3 is formed by enclosing the one end with a forming die, injecting synthetic resin material thereinto, and curing the resin in the present embodiment. However, the synthetic resin layer 5 can be adhered by other methods. The synthetic resin material used for the synthetic resin layer 5 can be either foamed or non-foamed. For example, it is possible to use olefin resin such as polyethylene resin and polypropylene resin. Examples of the foamed synthetic resin include polystyrene foam, polyethylene foam, rigid polyurethane foam, flexible polyurethane foam, rigid vinyl chloride foam, urea-formaldehyde foam, phenolic foam, acrylic foam, and cellulose acetate foam.

The socket 4 at the other end includes the pipe material 7 having a larger diameter than the corrugated synthetic resin pipe 1C and projecting coaxially from the outer surface of the other end 102a outwardly in the axial direction as shown in the longitudinal sectional view of FIG. 13. The synthetic resin material for the synthetic resin layer 8 is injected into at least the gaps between the pipe material 7 and the corrugated synthetic resin pipe 1C. The inner circumference surface of the cylindrical portion of the pipe material 7 projecting outwardly in the axial direction is substantially flat in the axial direction so as to function as the abutment surface 40 along which the insert end 3 is inserted. The synthetic resin layer 8 of the socket 4 can be made of the same synthetic resin material as used in the insert end 3.

Both the insert end 3 and the socket 4 are formed substantially flat in the axial direction in the present embodiment; however, the present invention is not limited to such shape. For example, the insert end 3 may be tapered toward the open end, and the socket 4 may have an inner circumference surface which is tapered substantially at the same angle and substantially parallel to the insert end 3. As another example, either the outer diameter of the insert end or the inner diameter of the socket may be curved in the axial direction. It is also preferable that the abutment surface 40 of the socket 4 is reverse-tapered toward the opening outside from inside so as to gradually reduce the diameter, thereby making the O-ring 6 of the insert end 3 watertight and airtight. The socket 4 is provided at its opening with a stepped taper 42, which prevents the O-ring 6 from being hooked by the opening and falling off when the insert end 3 is inserted.

Figure 15:
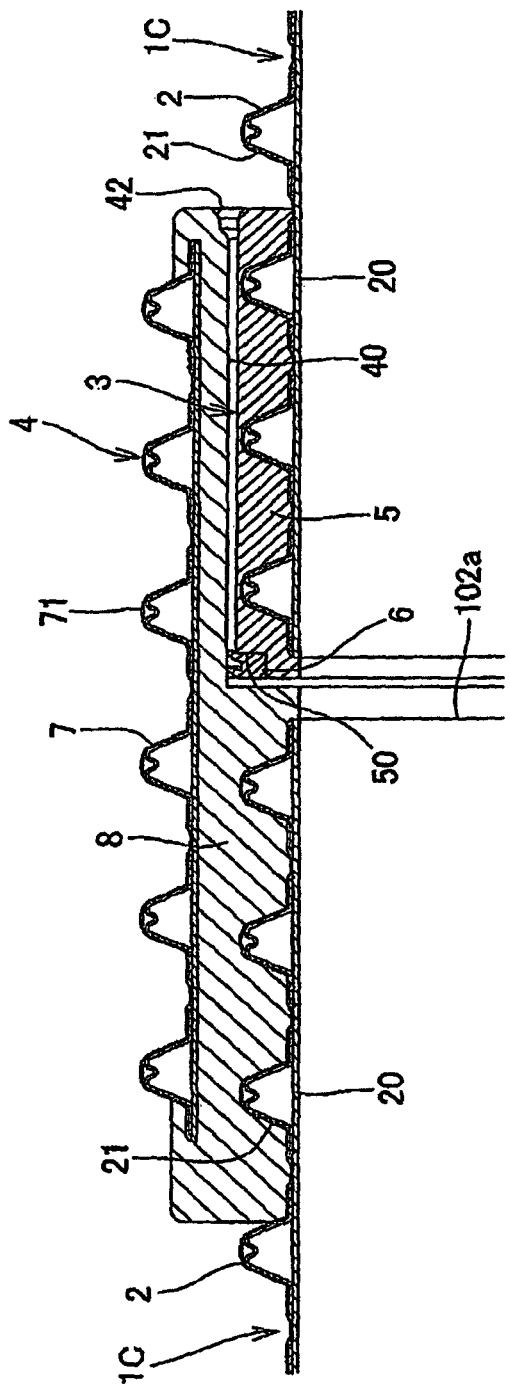
FIG. 15 is an enlarged longitudinal sectional view of another example of the pipe material as a component of the socket according to the fourth embodiment.

Similar to the corrugated synthetic resin pipe 1C, the pipe material 7 in the socket 4 is composed of a pipe portion having a series of waves with peaks and valleys of substantially triangular, substantially arc-shaped, or trapezoidal. The pipe material 7 significantly improves the strength of the socket 4. The present embodiment includes a pipe material (without the body 20 on the inner periphery side) having the same wave structure as the corrugated synthetic resin pipe 1C and a pipe wall 71 formed in a spirally corrugated shape. The same components are denoted by the same reference numerals, and thus a detailed description thereof will be omitted. However, the present invention is not limited to this type of the pipe material. A preferable modified example of the pipe material 7 has the body 20 on the inner periphery side as shown in FIG. 15. The pipe material 7 and the outer peripheral surface of the pipe wall 2 are firmly integrated together by the synthetic resin layer 8 disposed therebetween.

The synthetic resin layer 8 is adhered in such a manner that the pipe material 7 is partially exposed. The pipe material 7 is embedded in the synthetic resin layer 8 only on the tip side, which requires strength and on the proximal side, which is important in terms of the integration between the pipe material 7 and the pipe wall 2, and is exposed at the remaining portion. Exposing the pipe material 7 in this manner can reduce the weight and material cost. When the pipe material 7 has the same outer structure as the pipe wall 2 as in the present embodiment, the exposed portion of the socket 4 has the same appearance as the pipe wall 2, thereby improving unity between the joint and the entire pipe, and hence, their appearance.

Between the insert end 3 and the socket 4, there is provided the O-ring 6 as a seal member as shown in FIG. 13. More specifically, the insert end 3 is provided on its outer surface with the annular groove 50 for accommodating the O-ring 6, so that the pipes can be connected to each other with the O-ring 6 in the annular groove 50. The annular groove 50 in which the O-ring 6 is accommodated is formed as a notch at the tip edge of the insert end 3 in the present embodiment, but may alternatively be formed at the proximal edge opposite to the insert end 3, at a position between the tip edge and the proximal edge, or on the socket 4 side. The shape and structure of the seal member such as the O-ring 6 is not limited as long as sealing is ensured between the insert end 3 and the socket 4. Thus, seal members of various shapes and structures can be applied at a proper position. Instead of separately providing the O-ring 6, an annular protrusion as a seal member can be formed integrally with the insert end 3 or the socket 4. It is possible to coat the outer surface of the pipe 1C including the insert end 3 and the socket 4 at both ends with a coating agent for improving resistance to water, weather, and chemicals.

Figure 14:
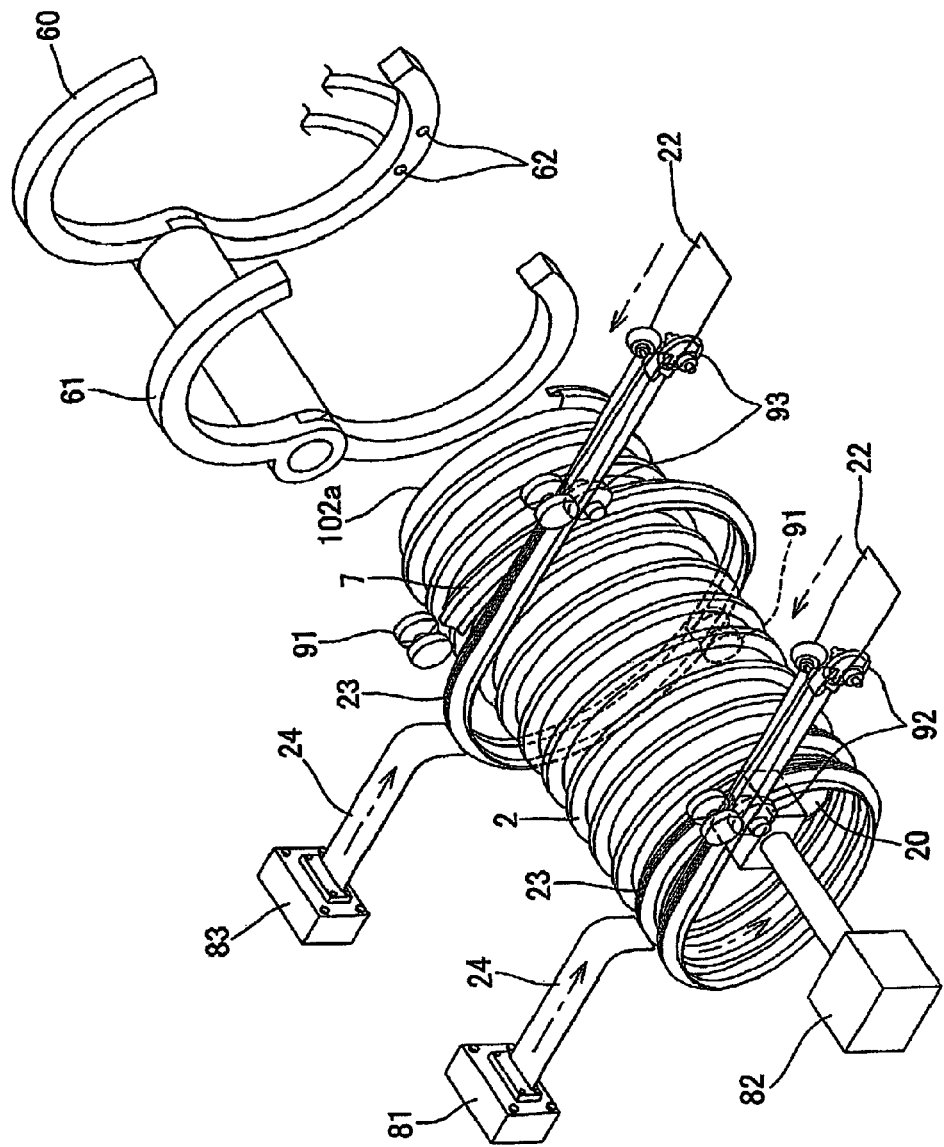
FIG. 14 is an explanatory drawing showing a method for manufacturing the corrugated synthetic resin pipe according to the fourth embodiment.

A method for manufacturing the corrugated synthetic resin pipe 1C will be described as follows based on FIGS. 14 and 16.

Figure 16:
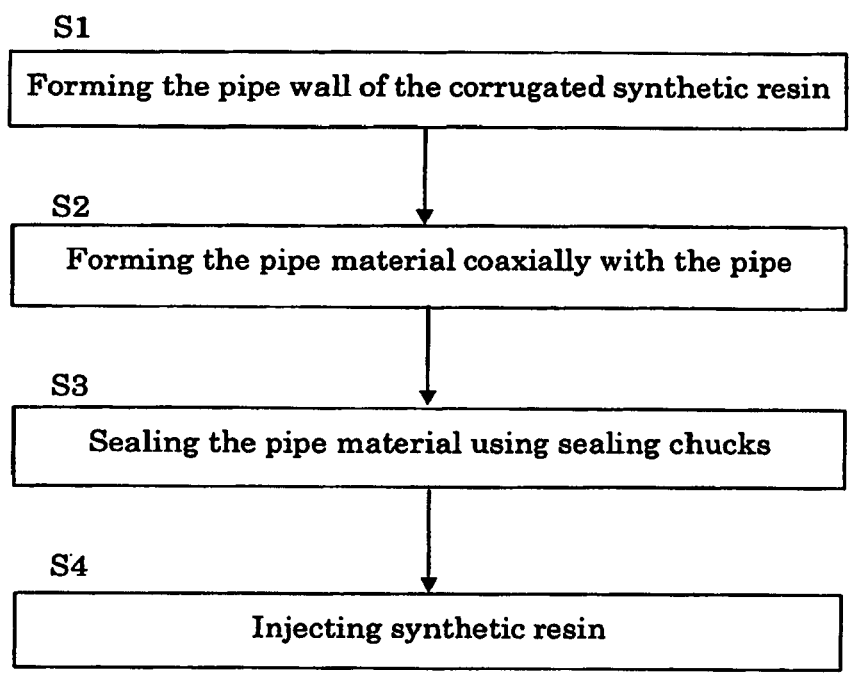
FIG. 16 is a flowchart showing the manufacturing procedure of the corrugated synthetic resin pipe.

The manufacturing procedure of the corrugated synthetic resin pipe 1C includes Steps S1 to S4 as shown in FIG. 16. In Step S1, the pipe wall 2 of the corrugated synthetic resin pipe 1C is formed. In Step S2, the pipe material 7 having a larger diameter than the corrugated synthetic resin pipe 1C is formed coaxially therewith on the other end 102a of the corrugated synthetic resin pipe 1C formed in Step 1. In Step S3, the pipe material 7 thus formed is sealed at the inner and outer ends in the axial direction using sealing chucks 60 and 61, respectively. In Step S4, synthetic resin material for forming the synthetic resin layer 8 is injected into the gaps between the pipe material 7 sealed using the sealing chucks and the pipe wall 2 of the pipe 1C.

The formation of the pipe wall 2 in Step S1 can be performed in the same manner as in the conventional method. The steel 22 continuously fed is deformation-processed to have an M-shaped cross section using processing rollers 92 and then discharged spirally. At the same time as this, an outer wound tape (outer surface layer 24) and an inner wound tape (body 20) are continuously discharged spirally from mouth rings 81 and 82, respectively so as to be adhered to the outer and inner surfaces, respectively, of the steel 22. As a result, the steel 22, the outer surface layer 24 and the body 20 are integrated in the axial direction to form the pipe wall 2. In the present embodiment, the formation of the pipe material 7 at the end of the pipe wall 2 is not performed after the pipe wall 2 is completed, but is performed in Step S2 immediately after the pipe wall 2 is formed in Step S1 so as to efficiently form the socket 4.

Similar to the formation of the pipe wall 2, in the formation of the pipe material 7 in Step S2, the steel 22 continuously fed is deformation-processed to have an M-shaped cross section using processing rollers 93, and then discharged spirally. At the same time as this, an outer wound tape (outer surface layer 24) is continuously discharged spirally from a mouth ring 83 so as to be adhered to the outer surface of the steel 22. In this case, no inner wound tape is used. As a result, the steel 22 and the outer surface layer 24 are integrated in the axial direction to form the pipe material 7. The pipe material 7 thus formed is supported from the radial outside by a plurality of guide rollers 91 functioning as guides so as to be supported coaxially with the pipe wall 2.

In Step S3, the sealing chucks 60 and 61 are attached to both ends of the pipe material 7 formed coaxially with the pipe wall 2 so as to seal the space between the pipe material 7 and the pipe wall 2. The sealed space is formed by setting an unillustrated mold for the abutment surface 40 of the socket 4 on the inner circumference surface of the pipe material 7 projecting outer than the pipe wall 2.

In Step S4, the sealed space is filled with the synthetic resin material for the synthetic resin layer 8. The synthetic resin material is injected through an inlet 62 which is communicated with the sealing chuck 60 in the axial direction in the present embodiment, but can be injected differently. For example, the sealing chuck 61 or the mold for the abutment surface 40 may have an inlet.

It goes without saying that the present invention is not limited to the embodiments thus described, and various modifications could be made within the scope of the present invention.

What is claimed is:

1. A drainage pipe connection structure for connecting a first corrugated synthetic resin pipe having an insert end at a connecting side end thereof to a second corrugated synthetic resin pipe having a a socket at a connecting side end thereof, comprising:
    the first and second corrugated resin pipes consisting of a pipe body with steel reinforcing projections spirally formed onto the outer surface thereof;
    wherein the insert end having a flat outer periphery by filling a synthetic resin into recesses between the reinforcing projections;
    the socket having a pipe material consisting of a short corrugated synthetic resin pipe which has a larger diameter than the second corrugated synthetic resin pipe, the pipe material is arranged in a concentric pattern to the second corrugated synthetic resin pipe and connected to the second corrugated synthetic resin pipe integrally by filling a gap between the pipe material and the second corrugated synthetic resin pipe with a synthetic resin, a tip side of the pipe material is elongated in a pipe axis direction over the tip of the second corrugated synthetic resin pipe and composed so as to engage with the flat outer periphery of the insert end.

2. The drainage pipe connection structure according to claim 1, wherein the pipe material is covered with a synthetic resin layer only a tip part and a rear end part at the outer surface and entirety covered with the synthetic resin layer at the inner surface, the pipe material and the second corrugated synthetic resin pipe are connected and integrated by adhering the synthetic resin layer at the inner surface of the pipe material to the filled synthetic resin layer.

3. The drainage pipe connection structure according to claim 2, wherein the synthetic resin layer covering the inner surface of the pipe material is configured so as to closely contact with the flat outer periphery of the insert end.

4. The drainage pipe connection structure according to claim 2, wherein the insert end has a flat joint surface consisting of a synthetic resin in the orthogonal direction to the pipe axis at the connection side end of the first corrugated synthetic resin pipe, the socket having a flat joint surface at the back side which is capable of closely contacting with the flat joint surface of the insert end.

5. The drainage pipe connection structure according to claim 4, wherein the flat joint surface of the insert end has an annular groove and the seal member is placed therein.

6. The drainage pipe connection structure according to claim 2, wherein the synthetic resin layer and the filled synthetic resin layer contain reinforcing fiber consisting of glass fiber.

7. The drainage pipe connection structure according to claim 6, wherein the pipe material is connected to the corrugated synthetic resin pipe using a fixing screw.

8. The drainage pipe connection structure according to claim 6, wherein said pipe material is embedded in the synthetic resin layer on the tip side and the proximal side and the remaining portion is exposed.

9. The drainage pipe connection structure according to claim 1, wherein the reinforcing projections consist of a thin metal sheet having an angle shape of a cross-section and a synthetic resin layer covered thereon, the reinforcing projections are integrated with the pipe body by welding the synthetic resin layer covering the thin metal sheet and the synthetic resin layer covering the pipe body.

10. The drainage pipe connection structure according to claim 1, wherein said reinforcing projections form corrugations with peaks and valleys.

11. The drainage pipe connection structure according to claim 1, wherein said reinforcing projections are spirally wound and form corrugations with peaks and valleys.

* * * * *